Jan. 26, 1943     T. E. ABEEL     2,309,563
ELECTROLYTIC CELL
Filed Feb. 26, 1940
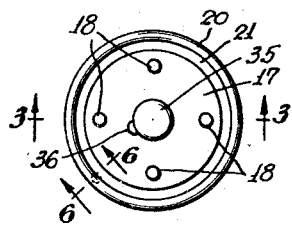
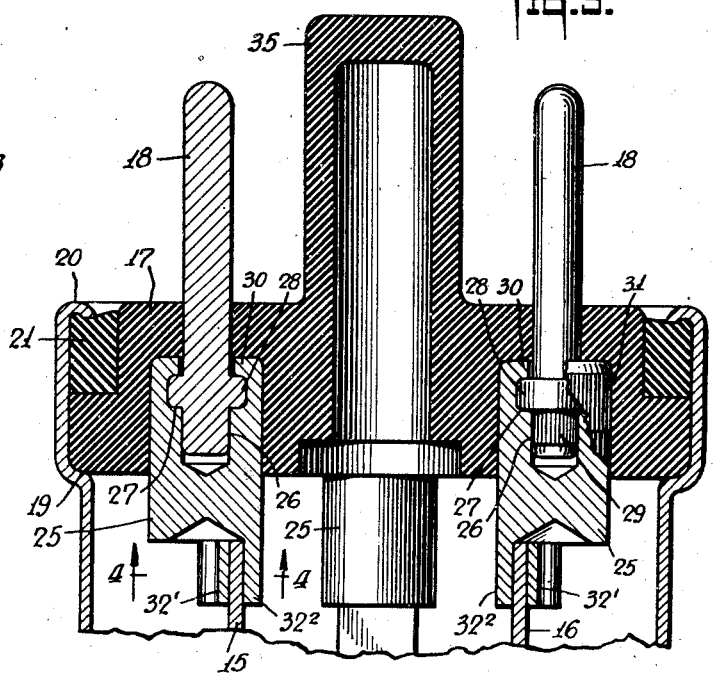
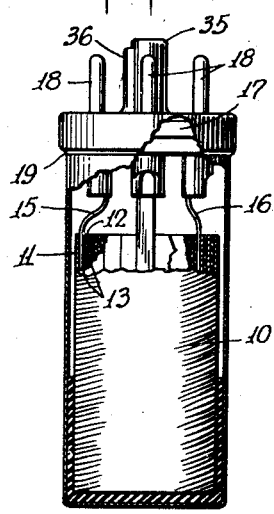
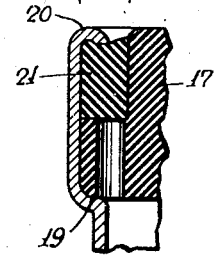
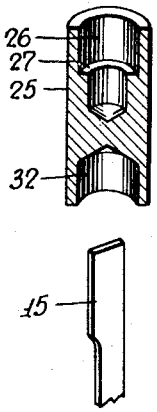
INVENTOR
*Theodore E. Abeel*
BY
*Dean Fairbank & Hirsch*
ATTORNEYS Patented Jan. 26, 1943

2,309,563

UNITED STATES PATENT OFFICE 2,309,563

ELECTROLYTIC CELL

Theodore E. Abeel, South Dartmouth, Mass., assignor to Aerovox Corporation, New Bedford, Mass., a corporation of New York Application February 26, 1940, Serial No. 320,791

7 Claims. (Cl. 175—315)

While the present invention has been particularly developed for and has special utility in dry electrolytic condensers of the prong terminal type, certain of the broader features thereof are of wider utility with other electrolytic cells.

Among the objects of the invention are to provide a terminal structure for an encased electrolytic apparatus, in which a soft metal is used in the unit and a harder metal for the terminal to meet the respective electrical and mechanical requirements and in which the connection between said diverse metals is so arranged as to preclude corrosion thereat that would result from any access thereto of electrolyte, particularly during operation.

In a specific application the soft aluminum active parts of an electrolytic condenser are all mechanically protected within the interior of the casing and only the brass or other harder metal of the terminals protrudes from the casing, the bond between the softer metal at the interior and the harder metal at the exterior being hermetically enclosed within the insulating cover to preclude access of electrolyte thereto and consequent erosion.

In the accompanying drawing in which is shown one of various possible embodiments of the several features of the invention, Fig. 1 is a view in longitudinal cross-section with parts shown in full, illustrating one embodiment of the invention, Fig. 2 is an end view of the said condenser, Fig. 3 is a view in longitudinal cross-section and on a larger scale taken on line 3—3 of Fig. 2, Fig. 4 is a sectional detail view taken on line 4—4 of Fig. 3, Fig. 5 is a dropped perspective view showing the relation of the terminal parts prior to assembly thereof, and Fig. 6 is a detail sectional view taken on line 6—6 of Fig. 2.

Referring now to the drawing, the condenser in general construction comprises a casing preferably of aluminum, enclosing a generally conventional dry electrolytic condenser roll 10. That roll briefly stated, may comprise four sheets including two metal foils 11 and 12 and two insulating interspacers 13 covering the opposite faces of one of the foils, the four sheets being enrolled. Electrolyte impregnates the interspacers and maintains the conductive path between the electrodes, at least one of which has a dielectric coating formed thereon. In the usual electrolytic condenser application both electrode foils are of film forming material, preferably aluminum. Flexible terminal tabs protrude from the end of the roll for connection of the electrodes into circuit. These flexible leads may be riveted or bonded to the electrode foils as for instance according to the disclosure of the prior patent to Georgiev No. 2,158,363 issued on May 16, 1939, or if desired they may be integral with the respective foils, being slit therefrom according to one conventional practice.

In the particular embodiment shown, the condenser roll is of the multiple wound type in which one of the foils is sub-divided into a plurality of sections spaced peripherally of the roll, each of such sections having a distinct flexible terminal lead.

In the drawing shown there is thus one terminal lead 15 from the continuous or cathode foil 11 and three leads one of which is shown at 16 from the respective three sections of the multiple wound anode foils. The construction as thus far described being illustrative and entirely conventional need not be more fully set forth.

The condenser is shown with an insulating cover 17, carrying prong terminals 18 shown four in number, desirably of brass which may be nickel or chromium plated and to which the respective flexible leads 15 and 16 are connected electrically and mechanically in manner to be more fully set forth hereinafter. The insulating cover 17 rests upon a peripheral shoulder 19 near the rim of the can, and in the completed assembly the rim of the can is rolled in as at 20 over the insulating cover and desirably over a peripheral rubber gasket 21 thereon.

According to the invention each flexible terminal lead 15, 16 of the active condenser unit is connected to the corresponding terminal prong 18 by an intervening coupling piece 25 of the same metal as the electrodes, usually aluminum and desirably generally cylindrical in contour.

The upper end of the coupling piece is formed with a socket 26 preferably presenting a shoulder 27 upon which rests a flange 28 integral with the base end of the brass prong, the inner extremity of which is knurled at 29 and snugly fits the corresponding lower end of socket 26. The rim of socket 26 is rolled inward as at 30, securely to bond the prong to the coupling piece which thus serves as a base or mount for the prong.

The coupling pieces are securely affixed to the insulating cover, preferably by making the same of "Bakelite" or equivalent plastic and molding the coupling pieces in place therein. For greater security the outer faces of the coupling pieces are knurled at 31 at their embedded portions.

The respective coupling pieces are accessible for contact connection at their inner ends with respect to the condenser roll. Desirably said coupling pieces protrude below said cover as shown. The flexible lead terminals 15, 16 are connected by an aluminum-to-aluminum contact to the respective coupling pieces by suitable clamping engagement. Preferably the lower end of the coupling piece is formed with a socket 32 therein, and the ends of the respective terminal strips 15, 16 extend into the respective sockets and the said sockets are laterally collapsed to present two generally semi-cylindrical nesting jaws 32' and 32² between which the end of the terminal lead or strip is securely gripped as shown.

As will be immediately obvious, the assembly is effected by affixing the respective prongs 18 into the coupling pieces 25 as described, molding the insulating cover 17 thereabout, securely to house the prong and the aluminum base thereof in such cover with the lower ends of the coupling pieces protruding. Thereupon the flexible terminal leads 15, 16 of the active condenser unit are introduced into the corresponding sockets 32 of the coupling pieces and clinched in position as above described and shown in Fig. 4. Finally the condenser unit as thus connected to the cover is inserted in the can, the cover 17 laid upon the shoulder 19, and the rim of the can is rolled over at 20 to complete the assembly.

Preferably the cover is molded with an integral hollow axial stud 35 which has an integral lateral key 36 that serves properly to position the respective prongs with corresponding contacts in the conventional socket in which the condenser structure is to be installed.

In the complete construction it will thus be seen that even with substantial flow or seepage of electrolyte in heavy duty use, as for instance on continuous service in a hot room, there is no possibility of corrosion. For, no electrolytic conductive path is possible at the region of contact between the diverse metals used, of aluminum for the interior, and brass or the like for the external parts. The only metal parts accessible to electrolyte are the foils with their tabs and the lower ends of the coupling pieces, all of which are of the same metal, aluminum. The area of contact between the brass or other harder metal terminal prongs with the aluminum coupling piece is completely and hermetically sealed in the embodiment shown, by being embedded in the interior of the molded cover 17 so that no electrolyte could possibly reach such region.

While the invention finds its preferred field of utility for dry electrolytic condensers of the prong terminal type, it will of course be understood that it is applicable to such condensers with other types of exterior terminals and that it could also be applied to advantage for other types of electrolytic cells.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. An electrolytic condenser of the plug-in type, comprising a casing having brass terminals, a dry electrolytic condenser unit therein, said unit comprising a pair of aluminum foils, each with two or more flexible aluminum terminal leads protruding therefrom, an insulating spacer intervening between said foils, electrolyte carried by the same and of type subject to possible seepage in use, aluminum coupling pieces intervening between the respective flexible leads and the brass terminals and effecting electrical and mechanical connection thereof, said coupling pieces having sockets at their outer ends, said brass terminals each having a flange near its base end, fitting into the corresponding socket, the outer rims of said socketed couplings being rolled over said flanges, a liquid-tight insulating cover mounting said coupling pieces, the inner ends of said coupling pieces having sockets opening into the interior of the casing, said sockets mechanically embracing the ends of the respective terminal leads.

2. An electrolytic condenser of the plug-in type, comprising a casing having a dry electrolytic condenser unit therein, said unit comprising a pair of aluminum foils, each with two or more flexible aluminum terminal leads protruding therefrom, an insulating spacer intervening between said foils, electrolyte carried by the same and of type subject to possible seepage in use, brass terminal prongs, aluminum bases therefor securely bonded thereto, an insulating cover carrying said prongs and the bases thereof, said aluminum bases protruding from the inner face of said cover and presenting sockets, the respective flexible terminal leads extending into said sockets and said sockets being collapsed for secure mechanical and electrical engagement with said leads within the casing.

3. An electrolytic condenser of the plug-in type, comprising a casing having a dry electrolytic condenser unit therein, said unit comprising a pair of aluminum foils, each with two or more flexible aluminum terminal leads protruding therefrom, an insulating spacer intervening between said foils, electrolyte carried by the same and of type subject to possible seepage in use, prongs of metal other than aluminum, aluminum coupling pieces constituting socketed bases for said prongs, a molded insulating cover embedding said socketed aluminum bases and the root ends of said prongs, said aluminum bases protruding into the condenser casing from the inner face of the insulating cover and presenting sockets at the lower ends thereof, the respective ends of said flexible terminal leads extending into said sockets, said sockets being collapsed for electrical and mechanical engagement thereof with the respective leads.

4. In an electrolytic condenser, the combination of a casing having a dry electrolytic condenser unit therein, including aluminum foil electrodes, an interspacer therebetween and electrolyte carried thereby and subjected to possible seepage during use, unitary flexible terminal leads protruding from said electrodes, an insulating cover having brass terminal prongs protruding from the outer face thereof, aluminum coupling pieces securely affixed to the base ends of said prongs, embedded in said cover and protruding at their inner ends into said casing, said flexible terminal leads being directly clamped in aluminum to aluminum contact with respect to said protruding ends of the coupling pieces, the inner ends of the respective aluminum coupling pieces being in the form of sockets, the flexible terminal leads in the form of foil strips extending into said sockets, said sockets being longitudinally collapsed to clasp the respective terminal leads between two generally semi-cylindrical shells thus formed.

5. A terminal assembly for an electrolytic cell comprising a flexible terminal strip of soft metal, a rigid terminal piece of hard metal and a connector coupling joining said elements into a unitary structure, said connector element having sockets lodging the corresponding ends of the elements it connects and clamped thereagainst for secure mechanical and electrical engagement thereof.

6. A terminal structure for an electrolytic cell, comprising a flexible aluminum terminal strip, an associated rigid brass terminal prong and an aluminum coupling piece therebetween, said coupling piece having a socket lodging the base end of said brass prong, said socket being pressed securely against said prong to retain the same against relative longitudinal and rotary displacement, said coupling piece having a socket at its opposite end lodging the end of the flexible terminal strip, said socket being compressed for secure direct metal to metal engagement with said terminal strip.

7. A terminal structure for an electrolytic cell, comprising a flexible aluminum terminal strip, a brass prong having a flange near its root end, an aluminum coupling piece firmly connecting the prong with respect to the flexible strip, said aluminum coupling piece having a socket presenting a shoulder seating said flange, the rim of said socket being rolled over said flange, the opposite end of said coupling piece having a socket lodging the extremity of said terminal strip, said socket being collapsed, securely to engage the end of said strip for intimate contact with opposite faces thereof.

THEODORE E. ABEEL.